March 6, 1951  H. PFENNINGER  2,544,235
COMBUSTION GAS TURBINE PLANT
Filed Nov. 23, 1945  2 Sheets-Sheet 1

Inventor:
Hans Pfenninger,
By Pierce & Scheffler,
Attorneys.

March 6, 1951  H. PFENNINGER  2,544,235
COMBUSTION GAS TURBINE PLANT
Filed Nov. 23, 1945  2 Sheets-Sheet 2

Inventor:
Hans Pfenninger,
By Pierce & Scheffler,
Attorneys.

Patented Mar. 6, 1951

2,544,235

UNITED STATES PATENT OFFICE 2,544,235

COMBUSTION GAS TURBINE PLANT

Hans Pfenninger, Baden, Switzerland, assignor to Aktiengesellschaft Brown, Boveri & Cie, Baden, Switzerland, a joint-stock company Application November 23, 1945, Serial No. 630,494
In Switzerland November 10, 1944

Section 1, Public Law 690, August 8, 1946
Patent expires November 10, 1964

11 Claims. (Cl. 60—41)

This invention relates to combustion gas turbine plants and particularly to turbine plants in which a number of compressors and gas turbines are connected in series, one or more of the turbines being a "power" turbine for driving any desired machine or load device.

Since each power turbine is in series with the turbine or turbines which operate the compressors, the power output can taper off towards zero only when the combustion gases are by-passed around the power turbine to flow through the turbines that maintain operation of the complete turbine plant assembly. It has been proposed to eliminate the by-pass regulator through the use of a regulating blower that is connected to the power turbine temporarily to maintain a load on the latter when the useful load of the driven machine diminishes towards zero. This method is not satisfactory however in view of difficulties in connecting the regulating compressor to the power turbine during operation of the plant. Furthermore, there is a definite limit to the power reduction that may be effected by decreasing the amount of motive air, i. e. by permitting the number of revolutions of the compressor to fall off sharply since, with diminishing compressor output, the thermodynamic efficiency of the compressor and turbine falls off and the required power equilibrium cannot be maintained below a definite level of reduced rotary speed as the temperature of the inlet to the turbine would rise to destructive values.

The present invention avoids these difficulties by connecting a compressor permanently to the power turbine which drives a load device or machine, and regulating the fuel input to the combustion chamber of that power turbine directly by a load-responsive device, the fuel supply to other combustion chambers being controlled directly or indirectly by the load-responsive device. The compressor driven by the power turbine imposes a substantial load upon the latter even under no-load condition of the turbine plant, and the difference between the power developed by the power turbine during no-load running and during full load or overload on the turbine plant is therefore relatively small.

Objects of the invention are to provide new and efficient combustion gas turbine plants of the type having a plurality of compressors and turbines in series in the motive fluid circuit, the turbine plants including comparatively simple regualting apparatus for controlling operation under varying loads. An object is to provide a combustion gas turbine plant of the character stated in which the power turbine or turbines continuously carry the load of a compressor in addition to the useful load of a driven machine or device. Another object is to provide a combustion gas turbine plant of the character stated in which the power outputs of an operation-maintaining turbine and a power turbine are regulated by controlling the supply of fuel to individual combustion chambers that develop the combustion gases for driving the respective turbines.

These and other objects and the advantages of the invention will be apparent from the following specification when taken with the accompanying drawings in which.

Figure 1:
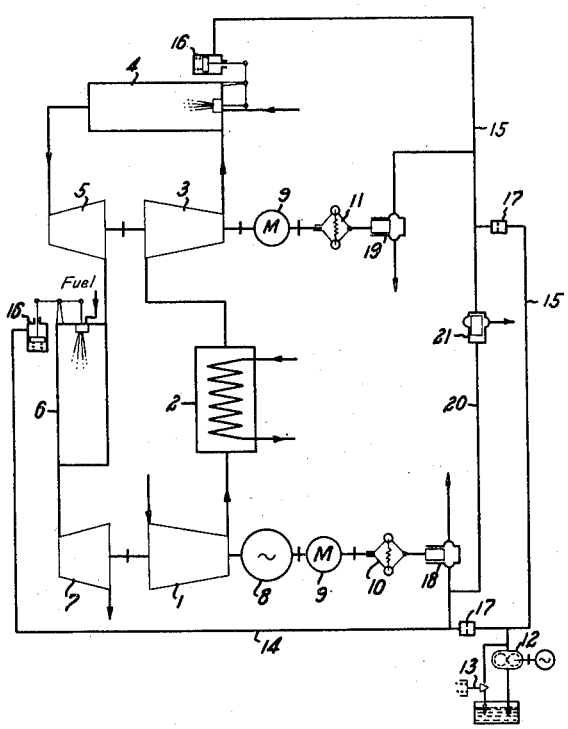
Figs. 1 to 4 illustrate diagrammatically different combustion gas turbine plants that embody the invention.

In Fig. 1 of the drawings, the reference numeral 1 identifies a low pressure compressor which forces air through a cooler 2 to the inlet side of the high pressure compressor 3, the high pressure air from compressor 3 going to the combustion chamber 4 into which fuel is introduced to develop combustion gases for operating the turbine 5 to drive the high pressure compressor 3. The exhaust gases from the turbine 5 go to the combustion chamber 6 where additional fuel is introduced to develop relatively low pressure motive gases for operating the power turbine 7 which drives the compressor 1 and a load device 8 which is indicated schematically as an alternating current generator. Starting motors 9 are provided for the shafts of the compressor-turbine assemblies 1, 7 and 3, 5 and ball governors or equivalent speed responsive devices 10, 11 are mounted on the respective shafts.

The low pressure turbine 7 should run at constant speed when the useful load is an alternating current generator, and the design of the turbine plant is preferably such that the temperatures at the inlets to the turbines 5 and 7 have their maximum permissible values when the plant is operating at full load. Upon diminishing load, the fuel supply to the low pressure combustion chamber 6 is first reduced, thereby decreasing the pressure within the combustion chamber 6 and increasing the pressure drop in the high pressure turbine 5. The power developed by the turbine 7 falls off with the decreasing pressure resulting from the load-regulated decrease of the fuel supply to the combustion chamber 6, and the turbine speed therefore remains constant over a certain upper range of load values. The fuel supply cannot be further reduced if the load drops still lower since sufficient fuel must be delivered to maintain combustion. The further regulation in the low range of load values is imposed upon the fuel supply to the combustion chamber 4 of the high pressure turbine 5. The resultant decreases in the speed of the high pressure turbine 5 effect corresponding drops in the pressure and volume of the compressed air output from the high stage compressor 3, thereby indirectly reducing the power developed by the low pressure turbine 7 by decreasing the pressure and volume of the mixture of air and combustion products delivered to the low pressure combustion chamber 6.

The regulating system for effecting the described successive controls of the fuel supplies to the combustion chambers 6 and 4 may be of the illustrated pressure fluid type including a pump 12 for delivering the pressure fluid, usually a lubricating oil, to a conduit system at a constant pressure determined by the loaded by-pass valve 13. Separate branch lines 14, 15 extend from the pump 12 to the pressure-actuated regulators 16 of the fuel supply nozzles, and measuring orifices 17 are located in each branch line to restrict the rate of pressure fluid flow into the branch lines. Bleeder valves 18, 19 are connected to the branch lines 14, 15 and actuated by the governors 10, 11 respectively to vent pressure fluid from the branch lines, and a jumper connection extends from the branch line 14 to the branch line 15. A vent valve 21 is included in the jumper or cross-connection 20, the valve comprising a piston floated in a casing and having its opposite ends subject to the pressures in branch lines 14 and 15 respectively. The valve 21 is so designed that the piston moves to vent the branch line 15 upon a decrease in the pressure in branch line 14, but does not move far enough to vent the branch line 14 upon a pressure drop in branch line 15.

Assuming that the combustion turbine plant is operating at the desired speed under full load, the power turbine 7 will tend to run at a higher speed if the load decreases. The increasing speed of the governor 10 will move the vent valve 18 to vent pressure fluid at a higher rate, and the fuel oil regulator 16 of the lower pressure combustion chamber 6 will be moved by its spring to reduce the fuel supply, thereby to reduce the pressure and volume of the combustion gases entering the turbine 7. The vent valve 21 in the cross-connection 20 tends to open, and may open, with the decreased pressure in branch line 14, but the fuel regulator 16 of the high pressure combustion chamber 4 is so designed, for example by the selection of a relatively weak spring, that this fuel supply is not reduced by the load-responsive controls 10, 18 until the load drops to about that critical value for which the fuel supply to combustion chamber 6 is reduced to the minimum required to maintain combustion. The speed of the high pressure turbine 5 tends to increase when the pressure in combustion chamber 6 drops with the reduced fuel supply, but the governor 11 and vent valve 19 will reduce the pressure in the branch line 15 to prevent the speed of the turbine 5 from rising about some preselected value. The speed governor 11 affects only the high pressure turbine as the valve 21 does not vent the pressure fluid line 14 when the pressure drops in the branch line 15.

Another method of control is employed for turbine plants in which the useful output never diminishes quite to zero and in which the speed range of the high pressure turbine 5 and associated apparatus is of limited extent, as may be the case for instance in driving pumps and blowers. A turbine plant of this type, as shown diagrammatically in Fig. 2, includes high pressure and low pressure assemblies as described above with reference to Fig. 1 and corresponding parts are identified by the same reference numerals. The speed governor 10 and valve 18 regulate the supply of fuel to the combustion chamber 6 of the low pressure turbine 7 that carries the useful load, and the speed governor 11 and valve 19 independently regulate the supply of fuel to combustion chamber 4 of the high pressure turbine 5. The low pressure assembly that carries the useful load operates at a constant or a variable speed according to the character of the load. As mentioned above, the rotary speed must remain constant under all loads when the driven apparatus is an alternating current generator. When the load apparatus is a direct current generator, a compressor or other apparatus adapted to operate over a range of speeds, the other serially connected compressor-turbine assemblies will be regulated within a limited range to take up a part of the load change. In all cases in which the useful output is delivered by the lowest pressure compressor-turbine unit, the speed change of the higher pressure unit or units should be limited to prevent pumping of the compressors. The permissible speed change for stable operations is about 20 to 30% of full load speed, and the regulating system is designed or adjusted in known manner to hold the speed within these limits.

The useful output may be taken, however, from a higher pressure compressor-turbine unit and, in such case, the lower or lowest pressure unit may be permitted to drop to a relatively low speed on partial loads, thus substantially reducing the amount of air drawn in and thereby precluding a drop in operating temperature at the reduced fuel inputs for partial loads. This method of regulation yields a higher efficiency at partial loads than does the method of regulation in which the lower pressure unit is operated at approximately constant speed, and thereby delivers an approximated constant amount of air.

Figure 2:
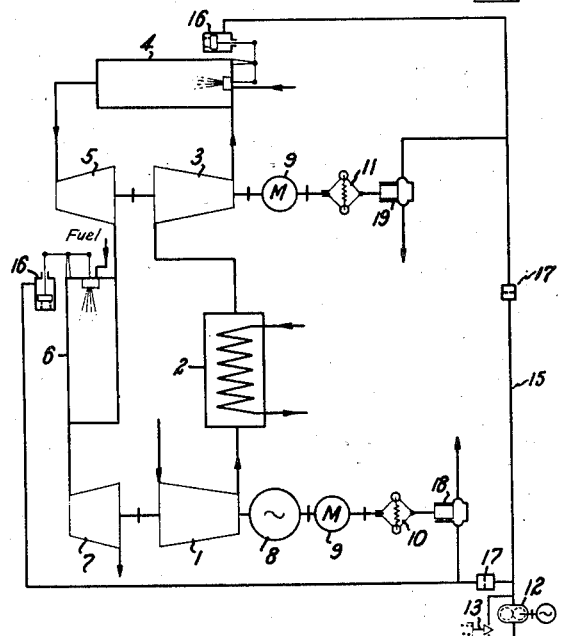
Figure 3:
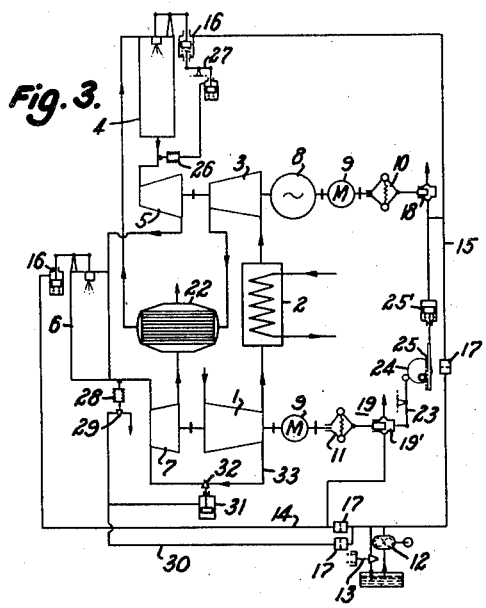

A turbine plant of this type is shown diagrammatically in Fig. 3 and, as compared with the assemblies of Figs. 1 and 2, the essential difference in the major elements is that the useful load 8 is now driven by the high pressure turbine. As in the previously described embodiments, a starting motor 9 is provided for each compressor-turbine unit, a load-responsive governor 10 is mounted on the same shaft as the load, and a governor 11 is mounted on the shaft of the auxiliary turbine-compressor unit. An air pre-heater 22 is arranged between the high stage compressor 3 and the combustion chamber 4 but this element, which is desirable for high efficiency, does not affect the method of regulation or the regulating apparatus. The speed governor 10 actuates valve 18 in the pressure fluid line 15 to drop the pressure upon a speed increase, thereby operating fuel regulator 16 to decrease the fuel input to the high pressure combustion chamber 4. The load-responsive governor 10 also operates indirectly to reduce the fuel input to the lower pressure combustion chamber. This control may be effected by displacing the casing 19' of the relief valve 19 of the lower pressure unit in accordance with the load-regulated pressure in the branch line 15; the mechanism for displacing the valve casing being shown diagrammatically as a lever 23 carrying the valve casing, a cam 24 against which the lever bears, a rack 25 for adjusting the cam, and a pressure cylinder 25' communicating with the pressure fluid line 15 and having a piston carrying the rack 25. A thermostat 26 at the inlet to the turbine 5 controls the stop mechanism 27 associated with the fuel regulator 16 to limit the temperature of the combustion gases entering the turbine 5.

The low pressure unit does not deliver any external output and therefore the load on compressor 1 and the power developed by the turbine 7 must be in equilibrium under all loadings of the power turbine 5. This equilibrium may be disturbed in the following ways.

(1) The temperature of the intake air may change, for example may rise and thereby increase the compressor load.

(2) The water temperature of the cooler 2 may rise, thereby increasing the pressure differential between the compressors and increasing the load on the compressor 1.

The governor 11 tends to compensate for these disturbances by adjusting valve 19 to increase the fuel input to the combustion chamber 6, but the fuel supply cannot be increased indefinitely as the temperature of the combustion gases would rise to destructive values. When the combustion gases attain their maximum permissible value, further regulation to maintain equilibrium may be obtained by reducing the pressure at the outlet of the compressor 1. As shown in Fig. 3, a thermostat 28 at the inlet to turbine 7 adjusts the valve 29 in the pressure fluid line 30 to increase the pressure at the operating device 31 of the valve 32 in a by-pass conduit 33 from the outlet of compressor 1 to the inlet of turbine 7. The valve 32 is thereby opened to a greater or less extent and air flows from the compressor 1 to reduce the outlet pressure and therefore the load on the axial flow compressor. The state of equilibrium is restored as the compressor load is reduced and the supply of pressure gas to the turbine is increased.

The disturbed equilibrium of the low pressure compressor-turbine unit may also be restored by changing the differential pressure between the turbines 5 and 7, and various arrangements for obtaining this action are possible.

Figure 4:
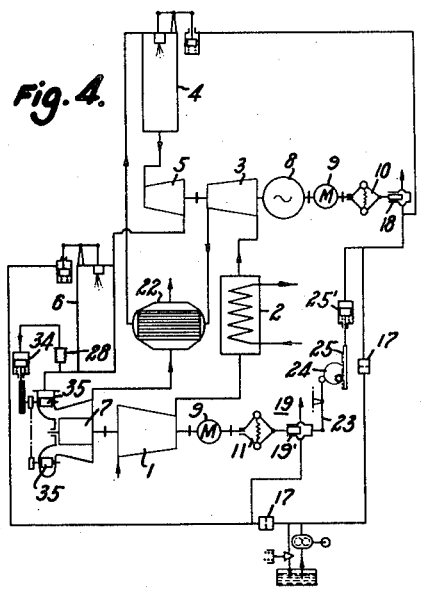

In the embodiment shown in Fig. 4, the turbine plant is similar to that shown in Fig. 3 and corresponding parts are identified by the same reference numerals. Upon reduced output of the turbine 7, the speed regulator 11 first attempts to remedy this reduced output by increased supply of fuel to the combustion chamber 6. As soon however as the highest admissible temperature in front of the turbine 7 is reached, the thermostat 28 turns the vanes 35 at the intake of turbine 7 towards closed position, whereby the differential pressure between the two turbines increases and the pressure drop and thus the output of the turbine is increased.

Figure 4A:
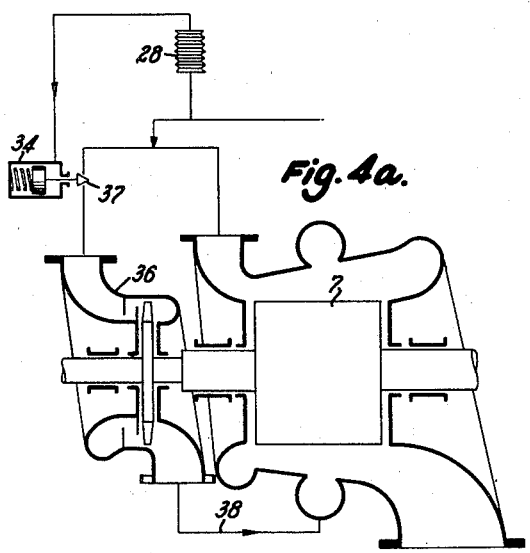
Figs. 4a and 4b are schematic views of a turbine and of a compressor, respectively, provided with vane regulating devices for controlling the developed power.

A similar increased turbine output for maintaining equilibrium without exceeding permissible temperatures may be effected, as shown in Fig. 4a, by admitting combustion gases to an auxiliary turbine 36 by valve 37 which is controlled by the thermostatic device 28 and servo-motor 34. The auxiliary turbine exhausts through conduit 38 i. e. to an intermediate stage of the axial flow gas-turbine 7.

Figure 4B:
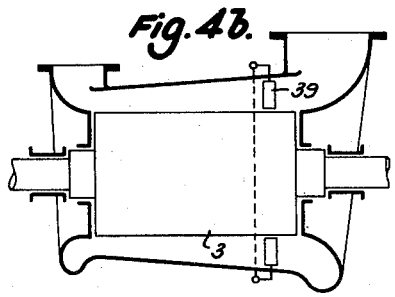

Another method of maintaining equilibrium, as illustrated in Fig. 4b, is based upon a regulation of vanes 39 at the inlet of the high pressure compressor 3. The vanes may be adjusted by a thermostatic device 28 at the inlet to the turbine 7, or by a similar thermostatic device, not shown, at the inlet side of the compressor 3. Adjustment of the vanes 39 changes the intake capacity of this compressor and thereby varies the pressure differential between the compressors. Increase in the vane angle decreases the pressure differential and thus reduces the load on the low stage compressor 1, thus leading to equilibrium between the power developed by turbine 7 and the load on compressor 1.

These auxiliary regulating members are necessary, however, not only when the equilibrium of the lower pressure unit is disturbed from outside by the above-mentioned influences, but also when the disturbance is instigated expressly for accelerating the unit upon an increase in load. In this case, the lowermost compressor-turbine unit must be first accelerated before an increased useful output can be developed. This acceleration for increasing the output of turbine 7 is initiated by the adjustment of valve casing 19' of valve 19 by the load-responsive governor 10. As long as this increase in the output of turbine 7 is obtained by increasing the fuel input to increase the temperature in front of the turbine, the auxiliary regulator need not be called on. If however, the temperature limit is reached, the auxiliary regulation under control of the thermostatic device 28 must be employed.

Figure 5:
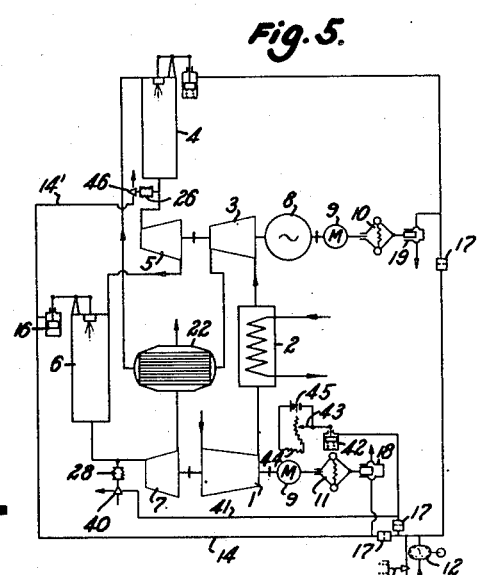
Fig. 5 is a diagrammatic view of another turbine plant embodying the invention.

Instead of the described auxiliary control members, an electrical transmission could be used, as shown in diagram in Fig. 5, to maintain equilibrium. In the event that the regulation of the fuel input to combustion chamber 6 by governor 11 tends to increase the temperature of the combustion gases above permissible values, the thermostatic device 28 adjusts valve 40 in the pressure fluid line 41 to vary the pressure on servo-motor 42 that actuates a regulating resistor 43 in series with the field winding 44 of motor 9 and a current source 45. A modified form of temperature regulation for the combustion gas input to turbine 5 is shown diagrammatically in Fig. 5. The thermostatic device 26 actuates a valve 46 in the pressure fluid line 14' from the fuel regulator 16 of the low pressure combustion chamber 6. The purpose of this control is to maintain the input temperature at the high pressure turbine 5 at its maximum permissible value by so adjusting the fuel input to the low pressure combustion chamber 6 that, upon a falling temperature at the entrance to turbine 5, the amount of fuel introduced into combustion chamber 6 is reduced. The resultant decrease in the speed of the turbine 7 and compressor 1 reduces the amount of air passing through the system and thereby increases the combustion gas temperature at the entrance to the turbine 5.

The invention is not limited to the particular constructions herein shown and described since other arrangements may be employed within the scope of the invention as set forth in the following claims.

I claim:

1. In a combustion gas turbine plant of the type including a plurality of turbine-compressor units 1. In series in the motive fluid circuit, a power turbine driving a load device and a compressor, at least one operation-maintaining turbine-compressor unit, a combustion chamber for each turbine in series in said motive fluid circuit, independent means for supplying fuel to each of said combustion chamber, a governor responsive to the speed of said load device, means actuated by said governor for controlling the fuel supply means to the combustion chamber directly preceding said power turbine, a second governor responsive to the speed of said operation-maintaining turbine, means actuated by said second governor for controlling the fuel supply means to the combustion chamber directly preceding said operation-maintaining turbine, and means superimposing a secondary control over the fuel supply to last said combustion chamber in accordance with the load on said power turbine, and auxiliary regulating means responsive to the speed of said operation-maintaining turbine-compressor unit for limiting the speed thereof to a preselected value.

2. In a combustion gas turbine plant, a plurality of turbine-compressor units having individual shafts and arranged in series in a motive fluid circuit, one of said units constituting the power supply for a load device and the other being used to stabilize operation of said plant, a combustion chamber preceding each turbine in said motive fluid circuit, independent means for supplying fuel to each combustion chamber, a load device driven by one of said turbines, a load responsive regulator for each turbine-compressor unit, means actuated by each said regulator for directly controlling the rate of fuel supply to the combustion chamber associated therewith, and means actuated by said regulator associated with the said unit supplying power to said load device for modifying the action of the other regulator.

3. In a combustion gas turbine plant, the invention as recited in claim 2 wherein the turbine which drives the load device is a low pressure turbine.

4. In a combustion gas turbine plant, the invention as recited in claim 2 wherein the turbine which drives the load device is a low pressure turbine, and said last mentioned means is actuated by the regulator after the fuel supply to said combustion chamber preceding the turbine driving the load device is reduced substantially to the minimum required to maintain combustion.

5. In a combustion gas turbine plant, the invention as recited in claim 2 wherein the turbine driving the load device is a high pressure turbine.

6. In a combustion gas turbine plant, the invention as recited in claim 2 wherein the turbine driving the load device is a high pressure turbine, and an operation-maintaining turbine is a lower pressure turbine that delivers no external output power, in combination with means responsive to the temperature at the exit of a combustion chamber for limiting the temperature of the motive fluid entering the next adjacent turbine.

7. In a combustion gas turbine plant, a plurality of turbine-compressor units in series in a motive fluid circuit, one of said units driving a load device and another unit being an operation-maintaining unit delivering no external output power, combustion chambers in said motive fluid circuit preceding each turbine, a separate fuel supply for each combustion chamber load-responsive means directly regulating the fuel supply to the combustion chamber preceding the turbine of the turbine-compressor unit driving the load device and also regulating the fuel supply to the combustion chamber preceding the turbine of the operation-maintaining turbine-compressor unit, and auxiliary regulating means additionally controlling the speed of the operation-maintaining turbine-compressor unit comprising means for controlling the differential pressure of the motive fluid between different turbine-compressor units to maintain equilibrium in said operation-maintaining unit.

8. In a combustion gas turbine plant, a plurality of turbine-compressor units in series in a motive fluid circuit, one of said units driving a load device and another unit being an operation-maintaining unit delivering no external output power, combustion chambers in said motive fluid circuit preceding each turbine, a separate fuel supply for each combustion chamber, load-responsive means directly regulating the fuel supply to the combustion chamber preceding the turbine of the turbine-compressor unit driving the load device and also regulating the fuel supply to the combustion chamber preceding the turbine of the operation-maintaining turbine-compressor unit, and auxiliary regulating means additionally controlling the speed of the operation-maintaining turbine-compressor unit comprising means for controlling the differential pressure of the motive fluid between turbines of different turbine-compressor units to maintain equilibrium in said operation-maintaining unit.

9. In a combustion gas turbine plant, a plurality of turbine-compressor units in series in a motive fluid circuit, one of said units driving a load device and another unit being an operation-maintaining unit delivering no external output power, combustion chambers in said motive fluid circuit preceding each turbine, a separate fuel supply for each combustion chamber, load-responsive means directly regulating the fuel supply to the combustion chamber preceding the turbine of the turbine-compressor unit driving the load device and also regulating the fuel supply to the combustion chamber preceding the turbine of the operation-maintaining turbine-compressor unit, and auxiliary regulating means additionally controlling the speed of the operation-maintaining turbine-compressor unit comprising means for controlling the differential pressure of the motive fluid between compressors of different turbine-compressor units to maintain equilibrium in said operation-maintaining unit.

10. In a combustion gas turbine plant, a plurality of turbine-compressor units in series in a motive fluid circuit, one of said units driving a load device and another unit being an operation-maintaining unit delivering no external output power, combustion chambers in said motive fluid circuit preceding each turbine, a separate fuel supply for each combustion chamber, load-responsive means directly regulating the fuel supply to the combustion chamber preceding the turbine of the turbine-compressor unit driving the load device and also regulating the fuel supply to the combustion chamber preceding the turbine of the operation-maintaining turbine-compressor unit, and auxiliary regulating means additionally controlling the speed of the operation-maintaining turbine-compressor unit comprising a by-pass conduit from the compressor of the operation-maintaining unit to the turbine thereof, and means responsive to the temperature at the entrance to that turbine for controlling air flow through the by-pass conduit.

11. In a combustion gas turbine plant, a plurality of turbine-compressor units on individual shafts and serially arranged in a motive fluid circuit, a load device driven by a high pressure turbine-compressor unit, another and lower pressure turbine-compressor unit being an operation-maintaining unit delivering no external output power, combustion chamber means in said circuit, means for supplying fuel to said combustion chamber means, means responsive to the loading of said load device for regulating the supply of fuel to said combustion chamber means, an electrical motor on each of said shafts, and means for maintaining equilibrium between the turbine output and the compressor loading of operation-maintaining turbine-compressor unit, said equilibrium-maintaining means including means controlling the power developed by the motor on the shaft of the operation-maintaining turbine-compressor unit.

HANS PFENNINGER.

REFERENCES CITED

The following references are of record in the file of this patent:

UNITED STATES PATENTS

| Number | Name | Date |
|---|---|---|
| 1,959,795 | Lysholm | May 22, 1934 |
| 2,095,991 | Lysholm | Oct. 19, 1937 |
| 2,219,994 | Jung | Oct. 29, 1940 |
| 2,238,905 | Lysholm | Apr. 22, 1941 |
| 2,303,381 | New | Dec. 1, 1942 |
| 2,336,232 | Doran | Dec. 7, 1943 |
| 2,371,899 | Hermitte | Mar. 20, 1945 |
| 2,372,686 | Sedille | Apr. 3, 1945 |